US006931464B1

(12) United States Patent
Reeves

(10) Patent No.: US 6,931,464 B1
(45) Date of Patent: Aug. 16, 2005

(54) METHOD FOR CONNECTING GIGABIT INTERFACE CONVERTERS WITH SERIAL IDENTIFICATION CAPABILITY INTO AN ACTIVE TWO-WIRE SERIAL BUS

(75) Inventor: Jay D Reeves, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 334 days.

(21) Appl. No.: 09/984,281

(22) Filed: Oct. 29, 2001

(51) Int. Cl.[7] .............................................. G06F 13/00
(52) U.S. Cl. ..................... 710/62; 710/107; 710/300; 710/302; 710/305
(58) Field of Search ................... 710/62, 107, 300, 710/302, 305

(56) References Cited

U.S. PATENT DOCUMENTS 6,105,142 A * 8/2000 Goff et al. .................. 713/324
6,253,267 B1 * 6/2001 Kim et al. ................... 710/302
6,308,239 B1 * 10/2001 Osakada et al. ............. 710/316
6,426,952 B1 * 7/2002 Francis et al. ............... 370/380
6,439,464 B1 * 8/2002 Fruhauf et al. .............. 235/492
6,564,275 B1 * 5/2003 Chen .......................... 710/107
6,671,814 B1 * 12/2003 Kubo et al. .................. 713/324

* cited by examiner

Primary Examiner—Jeffrey Gaffin
Assistant Examiner—Mohammad Farooq

(57) ABSTRACT

A method for connecting an interface to a serial bus is provided comprising the steps of sensing at least one identification line for the interface, identifying an interface type from the at least one identification line, and switching the interface to or from a serial bus depending on the interface type identified. The at least one identification line specifies at least one serial type of interface and at least one non-serial type of interface. Preferably, the method further comprises the step of switching the interface off the serial bus based on a criteria.

23 Claims, 3 Drawing Sheets

METHOD FOR CONNECTING GIGABIT INTERFACE CONVERTERS WITH SERIAL IDENTIFICATION CAPABILITY INTO AN ACTIVE TWO-WIRE SERIAL BUS

BACKGROUND OF THE INVENTION

A. Field of the Invention

The invention relates generally to connecting an interface to a serial bus, more particularly, to identifying an interface type from at least one identification line and switching the interface onto or off the serial bus depending on the interface type identified.

B. Background of the Invention

Present telecommunication systems employ a wide variety of connection interface types, such copper style, optical LW, Serial Module definition protocol, optical SW, for example. The systems include a variety of Fibre Channel systems to convert a Fibre Channel interface from one type to another. By way of example, by changing interface types a user can change a Fibre Channel interface on a product from copper to optical, or from optical to copper.

Often, these interface types carry data which must be transferred via a common bus within a communication device, such as a disc array controller. For example, a communication device may have a central processing bus for transmitting data between various semiconductors (e.g. DSPs, framers, de-packetizers) for performing processing steps on data packets. Hence, many of these components and/or interface types may share a common bus that may be sensitive to changes from one interface type to another interface type.

Gigabit Interface Converters (GBIC) are used in a variety of Fibre Channel systems to easily change (i.e. convert) a Fibre Channel interface from one type to another. The GBIC standard utilizes three TTL-compatible signal lines (MOD_DEF[2..0]) to specify at least eight GBIC types ("Module Definitions"). The table below explains the GBIC standard as presently implemented:

| Module Definition | MOD_DEF[0] | MOD_DEF[1] | MOD_DEF[2] | Interpretation |
|---|---|---|---|---|
| 0 | NC | NC | NC | GBIC not present |
| 1 | NC | NC | TTL LOW | Copper Style 1 or 2 connector, 1.0625 Gbm 100-TW-EL-S or 100-TP-EL-S, active inter-enclosure connector and IEEE802.3 100BASE-CX |
| 2 | NC | TTL LOW | NC | Copper Style 1 or 2 connector, 1.0625 Gb, 100-TW-EL-S or 100-TP-EL-S, active or passive intra-enclosure connection |
| 3 | NC | TTL LOW | TTL LOW | Optical LW, 1.0625 Gb 100-SM-LC-L |
| 4 | TTL LOW | SERIAL CLK | SERIAL DATA | Serial module definition protocol |
| 5 | TTL LOW | NC | TTL LOW | Optical SW, 1.0625 Gb 100-M5-SN-I or 100-M6-SN-I |
| 6 | TTL LOW | TTL LOW | NC | Optical LW, 1.0625 Gb 100-SM-LC-L and similar to 1.25 Gb IEEE802.3z 1000BASE-LX, single mode |

-continued

| Module Definition | MOD_DEF[0] | MOD_DEF[1] | MOD_DEF[2] | Interpretation |
|---|---|---|---|---|
| 7 | TTL LOW | TTL LOW | TTL LOW | Optical SW, 1.0625 Gb 100-M5-SN-I or 100-M6-SN-I and 1.25 Gb, IEEE802.3z, 1000BASE-SX |

Module Definition 4 specifies a serial definition protocol, wherein MOD_DEF[1] is used to transmit serial clock signals and MOD_DEF[2] is used to serial data. If a host interface detects a Module Definition 4 GBIC, the serial may then be activated thereby transmitting via MOD_DEF[2..1].

Depending on the implementation, changing interface types in configurations such as GBICs may result in a highly undesirable bus lockup. GBICs that support Module Definition 3 (for example) have both MOD_DEF[1] and MOD_DEF[2] internally connected to a TTL low. If a Module Definition 3 type is inserted into a system capable of two wire serial (TWS) communication, it will hold both the serial clock and serial data lines to a TTL low, which will prevent the bus from functioning properly. Hence, a need exists for a method for connecting an interface to a serial bus depending on the interface type identified. Further, a need exists for a method that quickly and automatically isolates an interface from a serial bus when a serial interface type is removed from the interface.

SUMMARY OF THE INVENTION

The present invention is directed at improving on one or more of the problems described above, and other problems found within the prior art.

According to one aspect of the present invention, a method for connecting an interface to a serial bus is provided comprising the steps of sensing at least one identification line for the interface wherein the at least one identification line specifies at least one serial type of interface and at least one non-serial type of interface, identifying an interface type from the at least one identification line, and switching the interface onto or off the serial bus depending on the interface type identified.

According to another aspect of the present invention, the method for connecting an interface to a serial bus further comprises the step of identifying a change of interface type from the at least one identification line, wherein the criteria for switching the interface off the serial bus is the identification of a change of type.

According to another aspect of the present invention, the criteria for switching the interface off the serial bus is a power-up operation.

According to another aspect of the present invention, the criteria for switching the interface off the serial bus is a power failure.

According to another aspect of the present invention, the method for connecting an interface to a serial bus further comprises the step of resetting the interface, wherein the interface is switched off the serial bus during reset.

According to another aspect of the present invention, the at least one identification line comprises three TTL-compatible signal lines, and the three TTL-compatible signal lines specify at least eight gigabit interface converter (GBIC) types. Preferably, the criteria for switching the interface off the serial bus is the removal of a GBIC.

According to another aspect of the present invention, a configurable serial bus interface is provided comprising at least one identification line input, an input identification monitor, a serial bus, and an isolator circuit to isolate the serial bus interface from the serial bus when a serial interface is not identified. Preferably, the serial bus interface transmits via the serial bus when a serial interface configuration is identified. More preferably, the interface comprises three inputs connected to three TTL-compatible identification lines, and the three TTL-compatible identification lines specify at least eight gigabit interface converter (GBIC) configurations.

According to another aspect of the present invention, a serial bus interface controller is provided comprising an input monitoring circuit, a serial bus enable circuit, and a reset circuit. The serial bus enable circuit isolates the serial bus interface from a serial bus when the input monitoring circuit detects a non-serial type of operation, and the reset circuit isolates the serial bus interface from a serial bus during reset. Preferably, the serial bus enable circuit isolates the serial bus interface from a serial bus when the input monitoring circuit detects a change in type of operation. More preferably, the serial bus enable circuit isolates the serial bus interface from a serial bus when a GBIC is removed.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

Reference will now be made in detail to presently preferred embodiments of the invention. Wherever possible, the same reference numbers will be used throughout the drawings to refer to the same or like parts.

Figure 1:
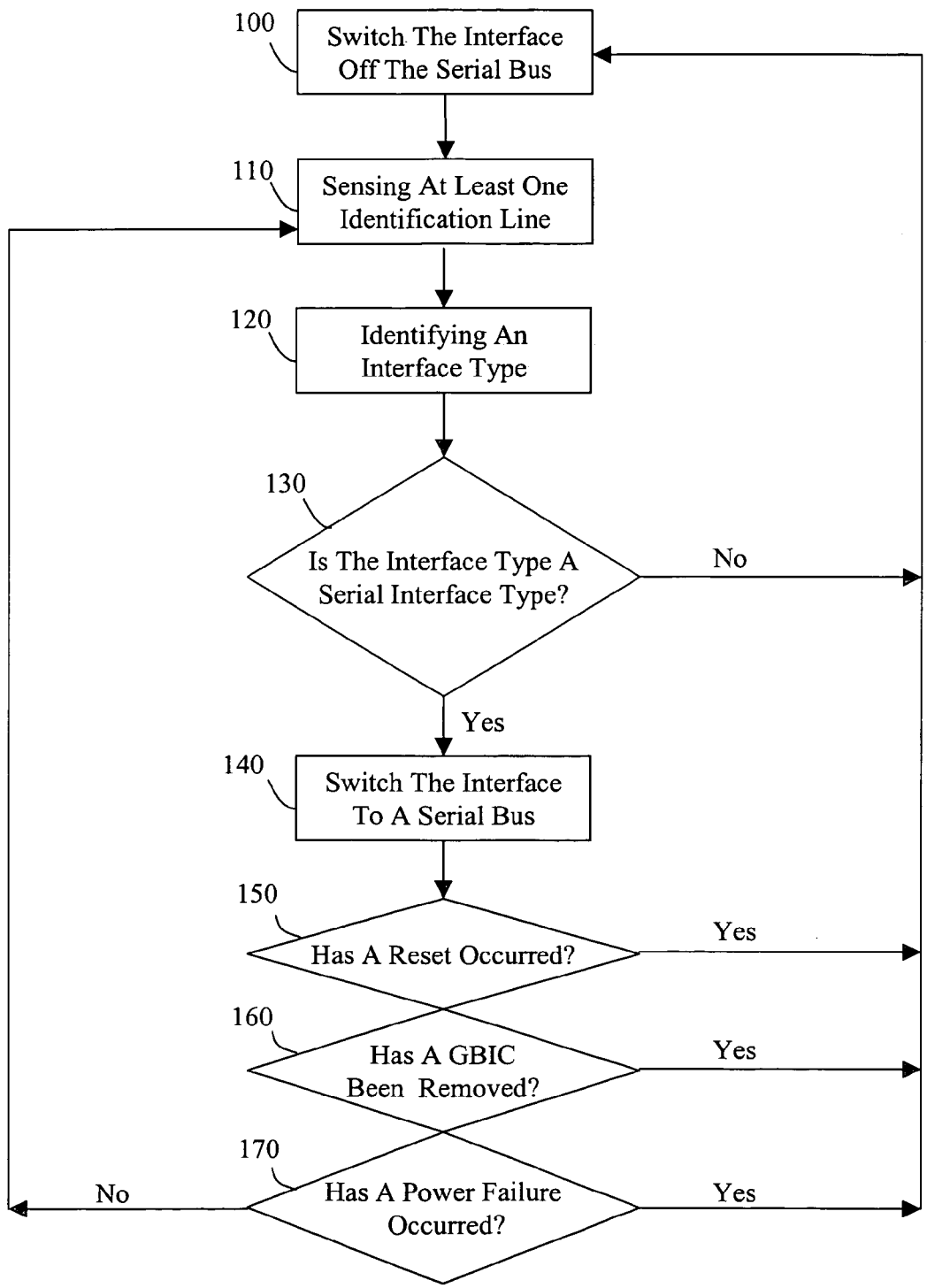
FIG. 1 is a block diagram of a first embodiment of a method for connecting an interface to a serial bus according to the present invention.

A first embodiment of a method for connecting an interface to a serial bus is shown by the block diagram of FIG. 1. By way of example, FIG. 1 will be described with reference to a GBIC implementation. Other interface configurations having a shared serial bus may also be implemented as would be readily apparent to one skilled in the art.

An interface according to this first embodiment, senses at least one identification line in step 110. For a GBIC implementation, the interface senses three TTL-compatible signal lines MOD_DEF[2..0] in step 110. In step 120, the interface identifies an interface type from the at least one identification line sensed in step 110. A Module Definition 4 serial definition protocol, for example, may be identified from the eight possible GBIC module definitions.

In step 130, the interface determines whether the interface type identified in step 120 is a serial interface type. The interface then uses a criteria to determine whether or not to switch the interface onto or off the serial bus in steps 140 and 100 respectively. If the interface type is not a serial interface type, for example a Module Definition 3 interface type, the interface switches off the serial bus in step 100 thereby isolating the serial bus. If the interface type is a serial interface type, for example a Module Definition 4 interface type, the interface switches onto a serial bus in step 140. Steps 100 and/or 140 may be performed by an electronic switch, a transmission gate, an isolation circuit, or other device as would be readily apparent to one skilled in the art.

Once the interface has been switched onto a serial bus in step 140, the interface may remain connected to the serial bus until an optional criteria is satisfied. Accordingly, the interface may be provided with a reset, whereby the interface switches off the serial bus in step 100 when a reset has occurred in step 150. By way of example, an operator reset button on an electronic device and/or a remote reset line from a controlling device may trigger a reset in step 150.

The interface may include a criteria for switching the interface off the serial bus in step 100 when a connection is removed. For example, an interface connected to a GBIC Module Definition 4 type may switch the interface off the serial bus when the GBIC is removed in step 160 and/or changed to a different GBIC Module Definition. The GBIC removal detection in step 160 and switching the interface off the serial bus in step 100 substantially prevents undesirable serial bus lockup.

The interface may include a criteria for switching the interface off the serial bus in step 100 during power failure and/or power up. By default, the interface may switch the interface off the serial bus in step 100 during power up. Default bus isolation has the advantage of keeping the serial bus free until the interface confirms that a serial compatible type is identified in step 130, as it may be a higher priority to prevent bus lockup which could disrupt other devices utilizing the bus than to obtain bus interface access a few milliseconds quicker.

Further, the interface may switch off the serial bus in step 100 when a power failure is detected in step 170. As aforementioned with respect to power up, power failure bus isolation also has the advantage of keeping the serial bus free until the interface re-confirms that a serial compatible type is identified in step 130. Generally with respect to GBIC implementations, as many devices may be communicating via a common serial bus, it is preferable to presume that the connected interface is not a compatible serial interface type until proven otherwise in step 130. Hence, both power up and power failure protection preferably default to switching the interface off the serial bus, and requiring the interface to confirm a compatible serial interface type in step 130.

According to this first embodiment, a method for connecting an interface to a serial bus can be implemented that substantially eliminates undesirable bus lockup. The method may be customized to the particular application at hand based on a number of optional criteria for determining whether to switch the interface onto or off the serial bus. The particular order of the steps depicted in FIG. 1 is purely exemplary for convenience of explanation, and is not limiting on the scope of the invention.

Figure 2:
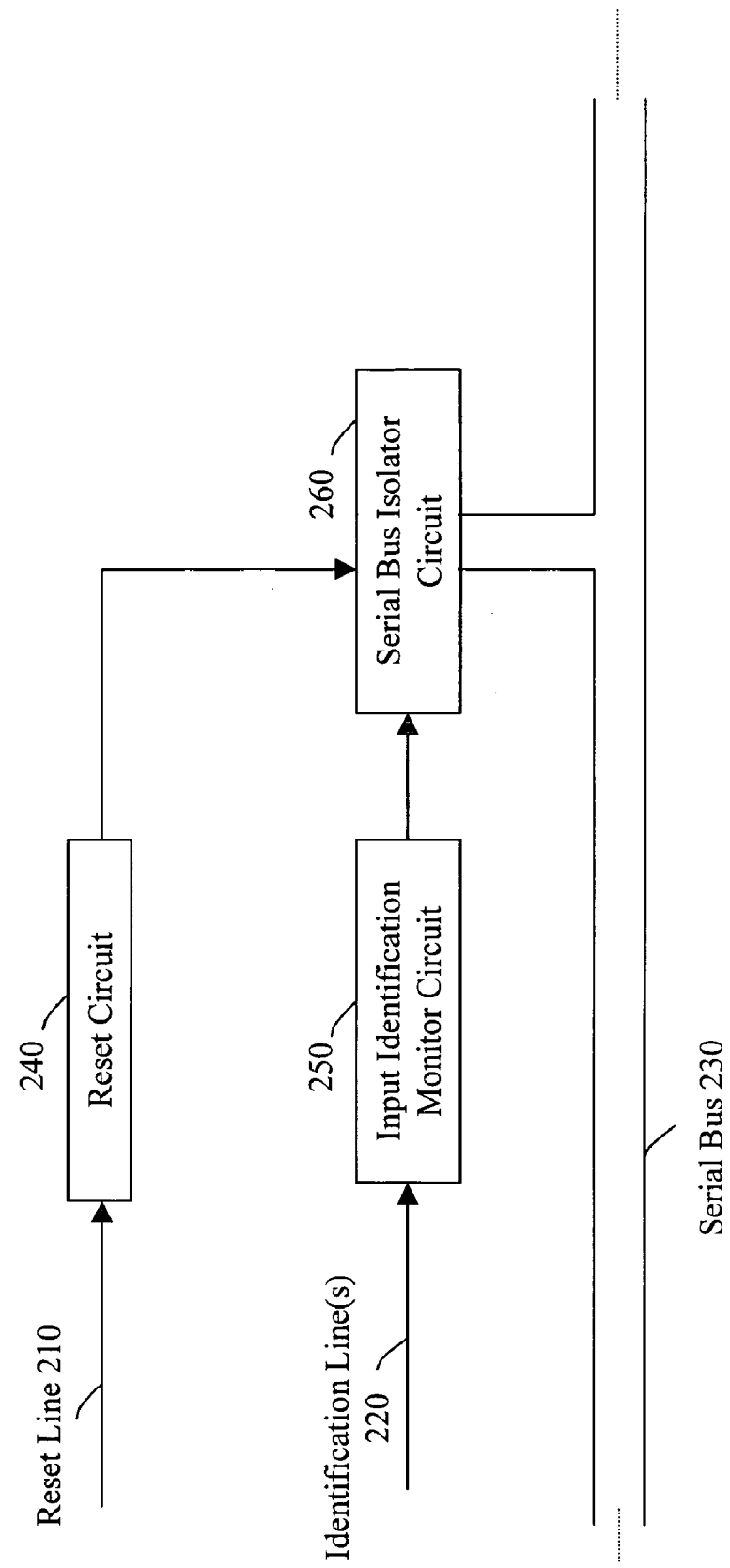
FIG. 2 is a block diagram of a second embodiment of a configurable serial bus interface according to the present invention.

A second embodiment of a configurable serial bus interface is shown by the block diagram of FIG. 2. A configurable serial bus interface according to this second embodiment comprises at least one identification line input 220, an input identification monitor circuit 250, a serial bus 230, and a serial bus isolator circuit 260. Optionally, the configurable serial bus interface may further include a reset circuit 240.

An interface according to this second embodiment monitors at least one identification line 220 via an input identification monitor circuit 250. The interface utilizes a serial bus isolator circuit 260 to permit the interface to transmit via the serial bus 230 when a serial interface configuration is identified via the input identification monitor circuit 250.

Optionally the serial bus isolator circuit 260 isolates the serial bus interface from the serial bus 230 during any one of a number of conditions. For example, the serial bus isolator circuit 260 may isolate the serial bus interface from the serial bus 230 during power up and/or power failure. Further, the serial bus isolator circuit 260 may isolate the serial bus interface from the serial bus when the input identification monitor circuit 250 detects a change in interface type and/or when an interface type is removed (e.g. an operator disconnecting an interface cable from the interface).

Optional reset circuit 240 may be provided to control the serial bus isolator circuit 260 responsive to a reset line 210. The reset line 210 may be connected to a reset button to allow an operator to cause the serial bus isolator circuit 260 to isolate the serial bus interface from the serial bus 230. Alternatively, the reset line 210 may be connected to an external control device (e.g. a master control computer) that can cause the serial bus isolator circuit 260 to isolate the serial bus interface from the serial bus 230. Other reset conditions as would be readily apparent to one skilled in the art may also be implemented.

Similar to a first embodiment of the present invention, a configurable bus interface according to this second embodiment substantially eliminates undesirable bus lockup. The interface may be customized to the particular application at hand based on a number of optional configurations that switch the interface onto or off the serial bus.

Figure 3:
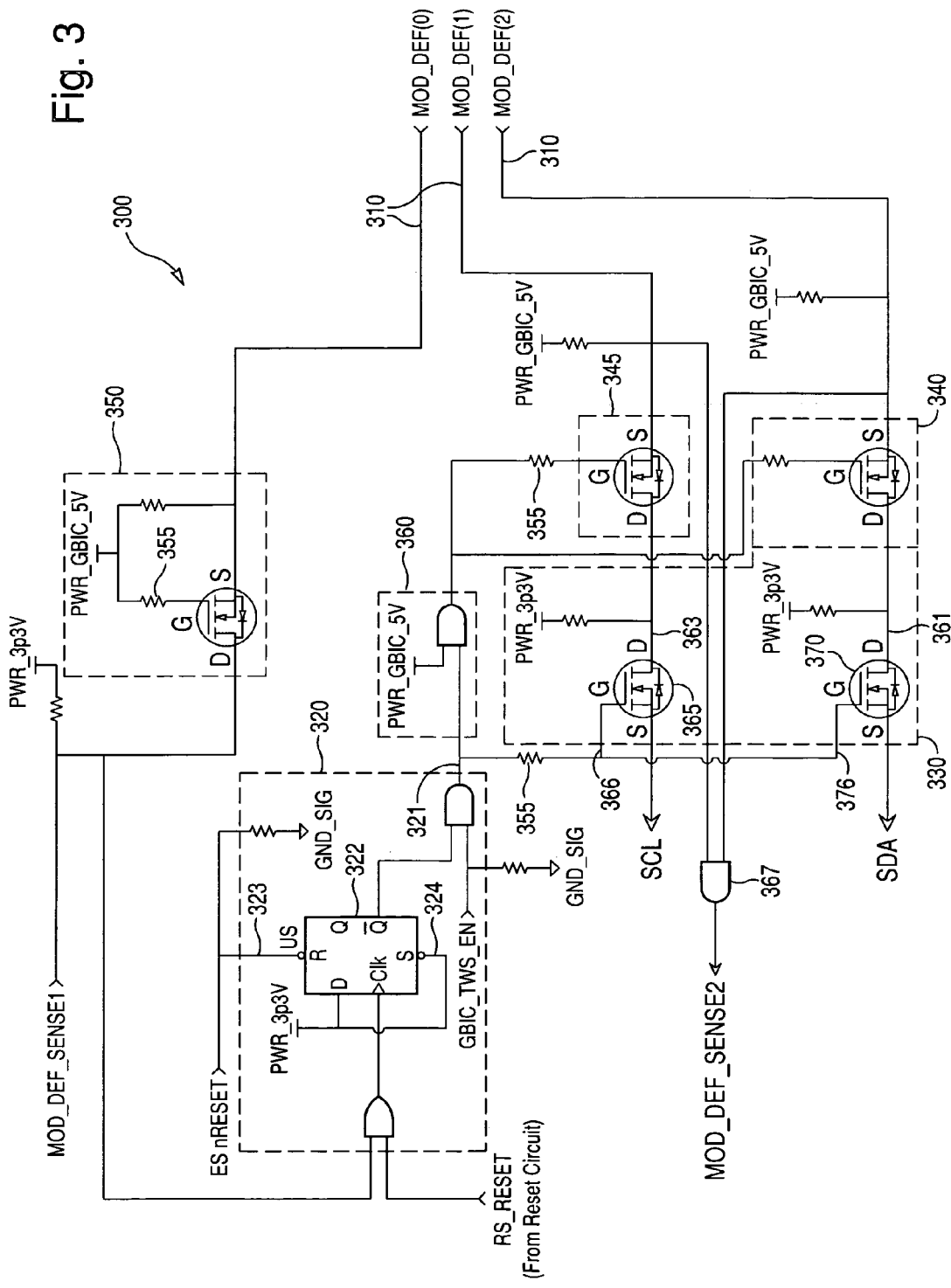
FIG. 3 is a block diagram of a third embodiment of a configurable serial bus interface according to the present invention.

A third embodiment of a configurable serial bus interface 300 is shown by the block diagram of FIG. 3. The serial bus according to this third embodiment comprises a serial clock line SCL and a serial data line SDA. A configurable serial bus interface 300 according to this third embodiment comprises at least one identification line input 310, an input monitoring circuit 320, and a serial bus isolator circuit 330. It should be noted that the input monitoring circuit 320 includes the coupling of MOD_DEF[2] and MOD_DEF[1] to lines 361 and 363 respectively of the serial bus isolator circuit 330 for monitoring MOD_DEF[2] and MOD_DEF[1] directly. For GBIC implementation, optional level shifting circuits 340, 345 and 350 may be provided to shift 5V identification lines 310 to 3.3V logic commonly used in low voltage families of parts. Further, oscillation dampening resistors 355 may be provided to substantially reduce the extent of circuit oscillations and signal reflections within the configurable serial bus interface 300.

According to this third embodiment, MOD_DEF_SENSE1 and MOD_DEF_SENSE2 may be connected to an external device such as a system computer or monitoring lights, to provide additional command and/or control of the configurable serial bus interface. External computer monitoring may be utilized, for example, to perform system wide command and control including enabling (e.g. GBIC_TWS_EN) and/or resetting (e.g. RS_RESET) the configurable serial bus interface 300. As shown, some or all of the identification lines 310 may be ANDed together by AND gate 367 (e.g. MOD_DEF[1] and MOD_DEF[2] as shown in FIG. 3) depending on the particular configuration.

The function of this third embodiment will now be described in reference to FIG. 3. During power up, the GBIC_TWS_EN is set to a TTL low, thereby providing a TTL low on the output line 321 of the input monitoring circuit 320. The TTL low output is provided to gates 366 and 376 of transistors 365 and 370 in the serial bus isolator circuit 330. These transistors 365 and 370 switch the serial bus interface 300 onto or off the serial clock line (SCL) and a serial data line (SDA), respectively. The TTL low applied to the gates 366 and 376 of the transistors 365 and 370 switches the serial bus interface 300 off the SCL and SDA lines, thereby isolating the serial bus interface 300 from the serial bus during power up. The serial bus interface 300 remains isolated from the serial bus until a serial interface type is identified by the input monitoring circuit 320. When a serial interface type is identified by the input monitoring circuit 320, the circuit then applies a TTL high output on output line 321 which is provided to the gates 366 and 376 of transistors 365 and 370, thereby switching the serial bus interface 300 onto the serial bus.

A Module Definition 4 serial interface is identified when the MOD_DEF[0] is a TTL low and MOD_DEF[2..1] are both TTL high. ES_nRESET is asserted low to reset the input monitoring D Flip Flop 322 to a TTL low on the Q output (e.g., the $\overline{Q}$ output is reset to a TTL high). Further, the GBIC_TWS_EN line is asserted TTL high. This results in a TTL high provided on the output line 321 of the input monitoring circuit 320 whenever the output of the D Flip Flop 322 is high. The GBIC_TWS_EN and ES_nRESET lines may be controlled, for example, by an external system computer monitoring the MOD_DEF_SENSE1 and MOD_DEF_SENSE 2 lines, or by an internal control circuit (not shown). The TTL high output on line 321 from the input monitoring circuit 320 enables the transistors 365 and 370 (via gates 366 and 376) of the serial bus isolator circuit 330, thereby switching to the SCL and SDA lines allowing the serial bus interface 300 to transmit via the serial bus.

The serial bus interface 300 switches off the serial bus when a serial bus type is removed or when a non-serial bus type is identified by applying a TTL low from the output 321 of the input monitoring circuits to the gates 366 and 376 of transistors 365 and 370. By way of example, the serial bus interface switches off the serial bus when a Module Definition 4 GBIC interface is removed from the interface. In an open drain architecture, when a Module Definition 4 GBIC interface is removed, MOD_DEF[0] transitions from a TTL low to a TTL high, thereby causing the input monitoring circuit 320 to clock in a TTL high to the D Flip Flop 322. A TTL low is then provided from the $\overline{Q}$ output of the Flip Flop 322 to the output on line 321 of the input monitoring circuit 320 responsive to the TTL high clocked into the D Flip Flop 322, resulting in a the serial bus isolator circuit 330 switching the serial bus interface off the SCL and SDA lines.

The present invention has an advantage of isolating up the serial bus interface as quickly as the delay times of the circuit elements (generally <50 ns), which substantially prevents other components from detecting any noticeable serial bus lockup. A similar response occurs when the GBIC interface changes from a Module Definition 4 type to a non-serial Module Definition type. The circuit may further provide additional protections, including isolating the serial bus during power failure and/or power up.

During power failure of the 5V supply, the PWR_GBIC_5V supply transitions to a TTL low thereby isolating the serial bus as follows. The power failure monitoring circuit 360 outputs a TTL low to the level shifting circuits 345 and 340 to make them non-conducting, which isolates the serial bus from the serial bus interface 300. Optionally, the power failure monitoring circuit 360 may be omitted, depending on the implementation.

During power failure of the 3.3V supply, the PWR_3p3V supply transitions to a TTL low thereby isolating the serial bus as follows. The input monitoring D Flip Flop 322 is set to a TTL high by the S not input 324, and correspondingly outputs a TTL low on the output line 321 of the input monitoring circuit 320. Similar to the power up condition previously described, the TTL low output on line 321 is provided to the control gates 366 and 367 of the serial bus isolator circuit 330, thereby isolating the serial bus interface 300 from the serial bus during power failure of the 3.3V supply.

In addition to power up and power failure bus isolation, a reset circuit or input may be provided to allow for a forced isolation of the serial bus. One reset configuration utilizes a RS_RESET input on line 323 from a reset circuit to clock a TTL high into the D Flip Flop 322, thereby causing a TTL low to be provided on the output line 321 of the input monitoring circuit 320. As previously described, a TTL low output from the input monitoring circuit 320 isolates the serial bus interface from the serial bus. This reset configuration provides for isolation of the serial bus when a reset occurs.

As would be readily apparent to one skilled in the art, various circuit elements of this third embodiment may be omitted or altered depending on the particular implementation, e.g., the power failure monitoring circuit may be omitted if it is not a concern. Likewise, a rearrangement of logic elements or a substitution of different logic elements in order to achieve the desired control and isolation is within the scope of the present invention. Hence, the present invention provides a highly configurable interface, that automatically switches an interface onto or off the serial bus depending on a criteria.

Thus, a method for connecting an interface to a serial bus has been described according to the present invention. Many modifications and variations may be made to the techniques and structures described and illustrated herein without departing from the spirit and scope of the invention. Accordingly, it should be understood that the methods and apparatus described herein are illustrative only and are not limiting upon the scope of the invention.

What is claimed is:

1. A method for connecting an interface to a serial bus comprising:
    sensing at least one identification line for the interface;
    identifying an interface type from the at least one identification line; and
    switching the interface onto or off the serial bus depending on the interface type identified;
    wherein the at least one identification line comprises three TTL-compatible signal lines, and wherein the three TTL-compatible signal lines specify at least eight gigabit interface converter (GBIC) types.

2. The method of claim 1, further comprising switching the interface off the serial bus based on a criteria.

3. The method of claim 2, further comprising identifying a change of interface type from the at least one identification line, wherein the criteria is the identification of a change of type.

4. The method of claim 2, wherein the criteria is a power-up operation.

5. The method of claim 2, wherein the criteria is a power failure.

6. The method of claim 2, further comprising resetting the interface, wherein the interface is switched off the serial bus during reset.

7. The method of claim 2, wherein the criteria is the removal of a GBIC.

8. The method of claim 1, wherein the interface comprises a Fibre Channel Interface.

9. The method of claim 1, wherein the at least one identification line specifies at least one serial type of interface and at least one non-serial type of interface.

10. The method of claim 9, wherein the at least one non-serial type of interface comprises a TTL low signal line or TTL high signal line.

11. A configurable serial bus interface comprising:
    at least one identification line input;
    an input identification monitor;
    a serial bus; and
    an isolator circuit to isolate the serial bus interface from the serial bus when a serial interface is not identified;
    wherein the interface comprises three inputs connected to three TTL-compatible identification lines, and wherein the three TTL-compatible identification lines specify at least eight gigabit interface converter (GBIC) configurations.

12. The interface of claim 11, wherein the serial bus interface transmits via the serial bus when a serial interface configuration is identified.

13. The interface of claim 11, wherein the isolator circuit isolates the serial bus interface from the serial bus during power up.

14. The interface of claim 11, wherein the isolator circuit isolates the serial bus interface from the serial bus during power failure.

15. The interface of claim 11, wherein the isolator circuit isolates the serial bus interface from the serial bus when the interface is reset.

16. The interface of claim 11, wherein the interface comprises a Fibre Channel Interface.

17. The interface of claim 11, wherein the isolator circuit isolates the serial bus interface from the serial bus when a GBIC is removed.

18. A serial bus interface controller comprising:
    an input monitoring circuit;
    a serial bus enable circuit; and
    a reset circuit,
    wherein the serial bus enable circuit isolates the serial bus interface from a serial bus when the input monitoring circuit detects a non-serial type of operation,
    wherein the reset circuit isolates the serial bus interface from a serial bus during reset, and
    wherein the an input monitoring circuit monitors three TTL-compatible signal lines, and wherein the three TTL-compatible signal lines specify at least eight gigabit interface converter (GBIC) types.

19. The interface of claim 18, wherein the serial bus enable circuit isolates the serial bus interface from a serial bus when the input monitoring circuit detects a change in type of operation.

20. The interface of claim 18, wherein the serial bus enable circuit isolates the serial bus interface from a serial bus during power up.

21. The interface of claim 18, wherein the serial bus enable circuit isolates the serial bus interface from a serial bus during power failure.

22. The interface of claim 18, wherein the interface comprises a Fibre Channel Interface.

23. The interface of claim 18, wherein the serial bus enable circuit isolates the serial bus interface from a serial bus when a GBIC is removed.

* * * * *